(12) United States Patent
Matsuo et al.

(10) Patent No.: US 10,673,215 B2
(45) Date of Patent: Jun. 2, 2020

(54) CLAMP

(71) Applicant: HIEN ELECTRIC INDUSTRIES, LTD., Osaka (JP)

(72) Inventors: Kazuhisa Matsuo, Osaka (JP); Kazuyoshi Chikiri, Fukuchiyama (JP); Makoto Morishita, Saitama (JP)

(73) Assignee: HIEN ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/056,933

(22) Filed: Aug. 7, 2018

(65) Prior Publication Data
US 2020/0052470 A1    Feb. 13, 2020

(51) Int. Cl.
| F16L 3/10 | (2006.01) |
| H02G 3/04 | (2006.01) |
| F16B 2/06 | (2006.01) |

(52) U.S. Cl.
CPC ........... *H02G 3/0456* (2013.01); *F16B 2/065* (2013.01); *F16L 3/10* (2013.01); *F16L 3/1008* (2013.01); *F16L 3/1091* (2013.01)

(58) Field of Classification Search
USPC .............. 248/229.2, 229.22, 229.24, 229.25, 248/229.26
See application file for complete search history.

(56) References Cited

U.S. PATENT DOCUMENTS

| 2,120,828 A * | 6/1938 | Wilkins | F16L 3/1033 248/61 |
| 4,799,444 A * | 1/1989 | Lisowski | F16B 2/06 114/221 R |
| 6,174,177 B1 * | 1/2001 | Auclair | H01R 4/44 439/100 |
| 7,467,767 B2 * | 12/2008 | Miles | F16L 3/1008 174/42 |
| 2016/0097413 A1 * | 4/2016 | Sumners | F16L 59/135 24/561 |
| 2017/0284870 A1 * | 10/2017 | Golden | F16B 2/065 |

FOREIGN PATENT DOCUMENTS

JP    2007-330042 A    12/2007

* cited by examiner

*Primary Examiner* — Alfred J Wujciak
(74) *Attorney, Agent, or Firm* — Westerman, Hattori, Daniels & Adrian, LLP

(57) ABSTRACT

A clamp includes a first member, a second member, and a fastener. The first member has a first connecting portion and a first supporting portion. The second member has a second connecting portion and a second supporting portion. The first connecting portion and the second connecting portion are twisted clockwise or counterclockwise such that a first clamping portion of the first connecting portion and a second clamping portion of the second connecting portion are tilted to the right or to the left with respect to a front-back direction when seen from above. A spiral hanger is mounted on a support wire by tightening the first member and the second member by the fastener in a state where a support wire is passed through between the first supporting portion and the second supporting portion and a spiral hanger is passed between the first clamping portion and the second clamping portion.

17 Claims, 5 Drawing Sheets

CLAMP

TECHNICAL FIELD

The present invention relates to a clamp for mounting a spiral hanger on a support wire.

BACKGROUND ART

When a new cable is to be laid between utility poles, a spiral hanger is suspended from a support wire (a messenger wire, a self-supporting cable or the like) installed in advance between the utility poles, and the new cable is passed through inside the spiral hanger, for example. The spiral hanger is mounted on the support wire by hardware, for example (see JP2007-330042A, for example).

The fixing hardware disclosed in JP2007-330042A includes a pair of plate-shaped clamping pieces and a plate-shaped tightening piece. When the fixing hardware is used, the pair of clamping pieces and the tightening piece are tightened by a bolt and a nut while the support wire is clamped by the pair of clamping pieces and the spiral hanger is clamped between one of the clamping pieces and the tightening piece. In this way, the spiral hanger can be mounted on the support wire.

SUMMARY OF INVENTION

Technical Problem

However, the fixing hardware described above requires three plate-shaped members (the pair of clamping pieces and the tightening piece), leading to an increased number of components for the fixing hardware. As a result, a weight of the fixing hardware increases. Moreover, as the number of the components increases, work efficiency may decrease in mounting of the spiral hanger on the support wire. Furthermore, the increased number of components makes it more difficult to suppress a manufacturing cost of the fixing hardware.

Thus, an objective of the present invention is to provide a clamp that enables the spiral hanger to be mounted on the support wire correctly while an increase in the number of components is suppressed.

Solution to Problem

The present invention has a gist of the following clamp.

(1) A clamp for mounting a spiral hanger on a support wire extending in a front-back direction, including:

a first member having a first through hole formed therein, the first through hole penetrating in a right-left direction;

a second member provided to the left of the first member and having a second through hole formed therein, the second through hole penetrating in the right-left direction and facing the first through hole; and a fastener inserted through the first through hole and the second through hole and tightening the first member and the second member to each other in the right-left direction, in which the first member has:

a plate-shaped first base portion having the first through hole formed therein;

a plate-shaped first connecting portion protruding from the first base portion to diagonally upper left; and a first supporting portion provided below the first base portion and curved arcuately in such a manner as to project toward the right;

the second member has:

a plate-shaped second base portion having the second through hole formed therein;

a plate-shaped second connecting portion protruding from the second base portion to diagonally upper right, the second connecting portion being provided to overlap with the first connecting portion above the spiral hanger when seen from the front-back direction; and a second supporting portion provided below the second base portion and curved arcuately in such a manner as to project toward the left;

the first connecting portion has a first clamping portion facing the second connecting portion in the right-left direction;

the second connecting portion has a second clamping portion facing the first clamping portion in the right-left direction;

the first connecting portion and the second connecting portion are twisted clockwise or counterclockwise such that the first clamping portion and the second clamping portion are tilted to the right or to the left with respect to the front-back direction when seen from above; and the spiral hanger is mounted on the support wire by tightening the first member and the second member by the fastener in a state where the support wire is passed between the first supporting portion and the second supporting portion and the spiral hanger is passed through between the first clamping portion and the second clamping portion.

(2) The clamp according to the item (1) in which the first member has a first locking portion protruding upward from the first base portion at a position away from the first connecting portion backward and extending to the left to pass behind the second connecting portion;

the second member has a second locking portion protruding upward from the second base portion at a position away from the second connecting portion forward and extending to the right to pass in front of the first connecting portion;

an upper part of the second connecting portion is provided behind an upper part of the first connecting portion in such a manner as to overlap with the upper part of the first connecting portion when seen from the front-back direction; and the first connecting portion and the second connecting portion are twisted counterclockwise such that the first clamping portion and the second clamping portion are tilted to the left with respect to the front-back direction when seen from above.

(3) The clamp according to the item (1) or (2), in which a notch is formed on a backward side of the upper part in the first connecting portion and on a frontward side of the upper part in the second connecting portion, respectively, such that the upper part of the first connecting portion and the upper part of the second connecting portion can be crossed each other when seen from the front-back direction.

(4) The clamp according to any one of the items (1) to (3), in which a notch is formed in a lower part of the first supporting portion and in a lower part of the second supporting portion, respectively, such that the lower part of the first supporting portion and the lower part of the second supporting portion can be crossed each other when seen from the front-back direction.

(5) The clamp according to any one of the items (1) to (4), in which a protective film made of a resin is formed on a surface of each of the first supporting portion and the second supporting portion.

Advantageous Effects of Invention

According to the present invention, the clamp that enables the spiral hanger to be mounted on the support wire correctly while an increase in the number of components is suppressed can be obtained.

DESCRIPTION OF EMBODIMENTS

Figure 1:
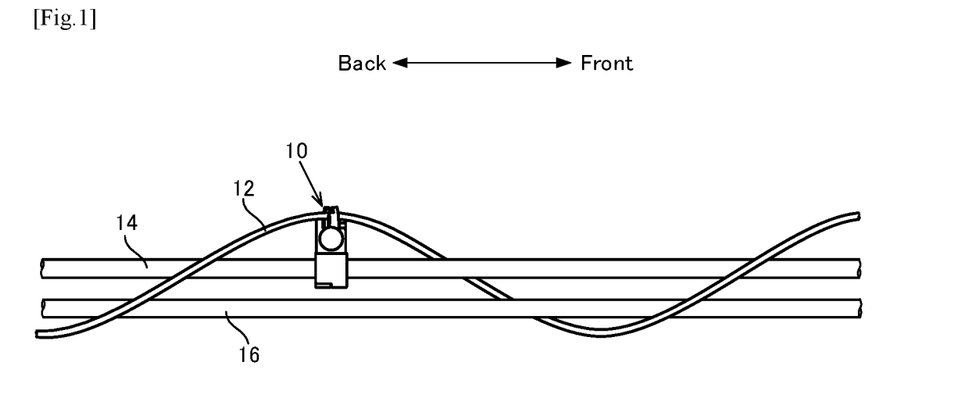
FIG. 1 is a view for explaining a use example of a clamp according to an embodiment of the present invention.

A clamp according to an embodiment of the present invention will be described below with reference to the attached drawings. FIG. 1 is a view for explaining a use example of a clamp 10 according to an embodiment of the present invention.

Referring to FIG. 1, the clamp 10 according to the embodiment is used for mounting a spiral hanger 12 (hereinafter abbreviated as a hanger 12) on a support wire 14. The support wire 14 is installed between utility poles, which are not shown. As illustrated in FIG. 1, in the Description, an extending direction of the support wire 14 is referred to as a front-back direction. In the Description, the phrase "seen from the front-back direction" means that being seen from front or back. In the Description, a right-left direction and a vertical direction of the clamp 10 is specified with reference to the front-back direction in a state where the clamp 10 is supported by the support wire 14 (state illustrated in FIG. 1). Moreover, in the following, the configuration of portions of the clamp 10 will be explained with reference to the state where the clamp 10 is supported by the support wire 14.

For the support wire 14, a messenger wire, a self-supporting cable or the like can be used. Any cable 16 may be passed through a space inside the hanger 12. The number of the cables passed through the space inside the hanger 12 is not limited to one but a plurality of the cables may be passed through the space inside the hanger 12. Moreover, the construction of the support wire 14 is not limited to an example illustrated in FIG. 1 but a support wire portion of a self-supporting cable in which the support wire portion and a cable portion are integrally formed may be used as the support wire such as the self-supporting cable disclosed in the JP2007-330042A.

Figure 2:
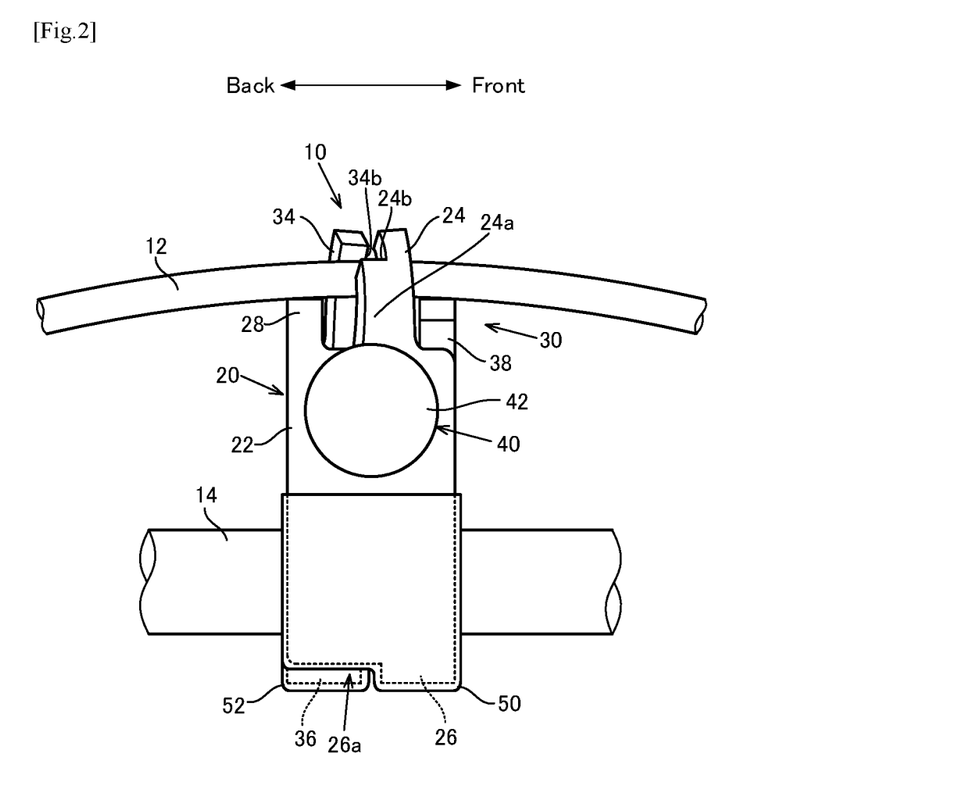
FIG. 2 is a view of the clamp seen from the right side.
Figure 3:
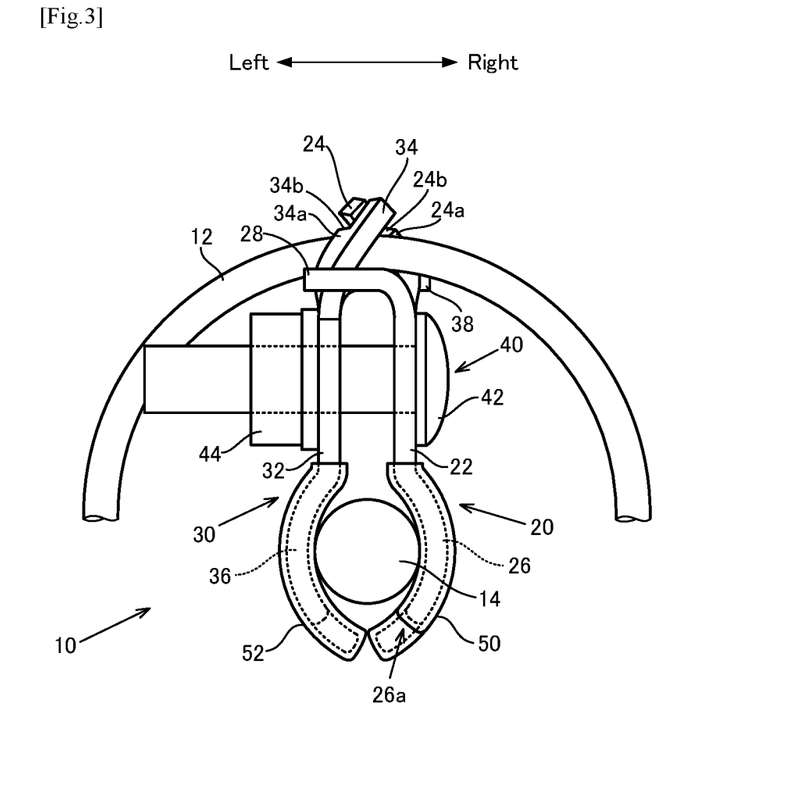
FIG. 3 is a view of the clamp seen from the back.
Figure 4:
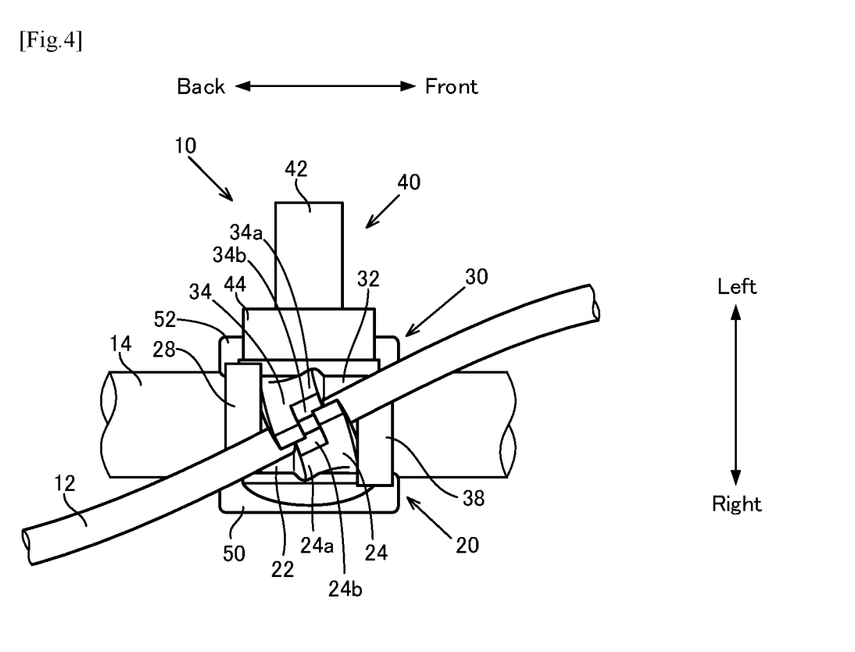
FIG. 4 is a view of the clamp seen from above.
Figure 5:
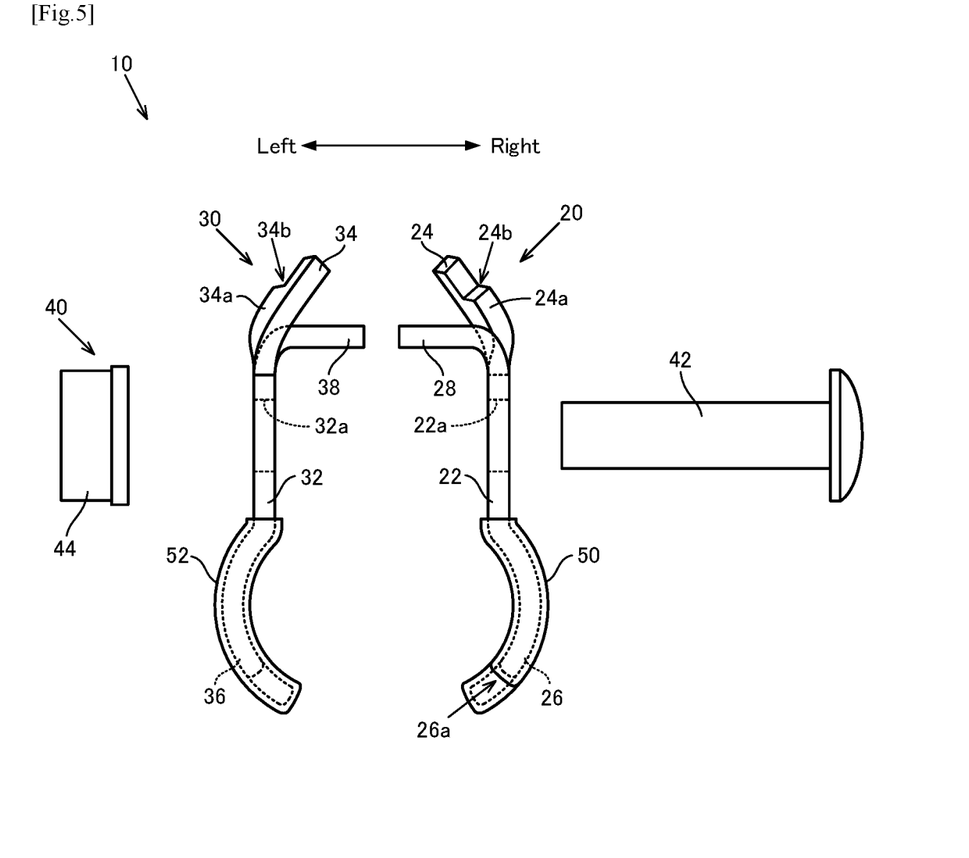
FIG. 5 is an exploded view of the clamp.

FIG. 2 is a view of the clamp 10 when seen from the right side, FIG. 3 is a view of the clamp 10 seen from the back, FIG. 4 is a view of the clamp 10 seen from above, and FIG. 5 is an exploded view of the clamp 10.

Figure 6A:
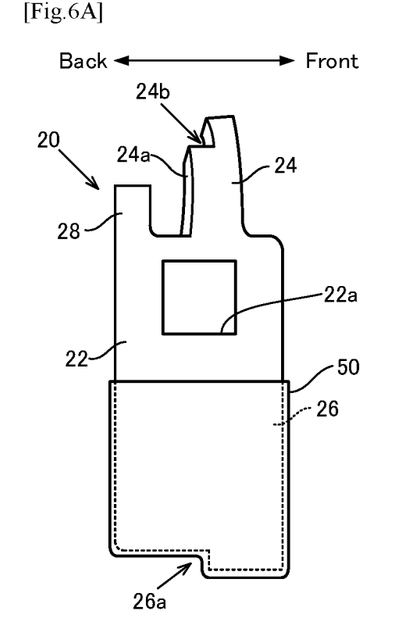
FIG. 6A is a view of a first member seen from the right side and FIG. 6B is a view of a second member seen from the left side.
Figure 6B:
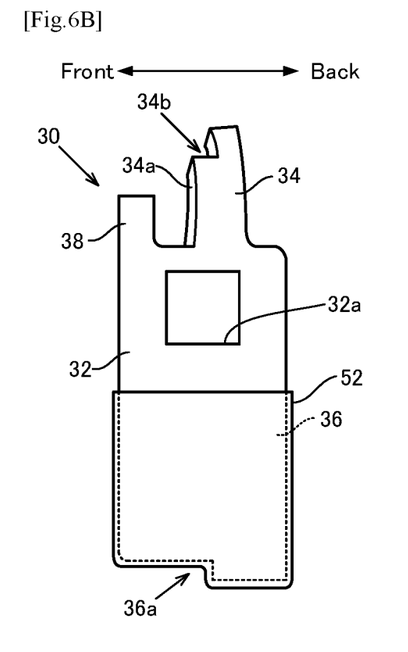

Referring to FIGS. 2 to 5, the clamp 10 includes a first member 20, a second member 30, and a fastener 40. FIG. 6A is a view of the first member 20 seen from the right side, and FIG. 6B is a view of the second member 30 seen from the left side.

Referring to FIGS. 2 to 6, the first member 20 has a first base portion 22, a first connecting portion 24, a first supporting portion 26, and a first locking portion 28. The second member 30 is provided to the left of the first member 20. The second member 30 has a second base portion 32, a second connecting portion 34, a second supporting portion 36, and a second locking portion 38. In the embodiment, the first member 20 and the second member 30 have the same or substantially the same shape and can be manufactured by press forming using a common mold. In the embodiment, the first member 20 and the second member 30 can be formed, for example, by metal material or resin material.

The first base portion 22 of the first member 20 is formed in a plate shape. At a center part of the first base portion 22, a first through hole 22a penetrating in the right-left direction (plate thickness direction) is formed. The second base portion 32 of the second member 30 is formed in a plate shape. At a center part of the second base portion 32, a second through hole 32a penetrating in the right-left direction (plate thickness direction) is formed. The second through hole 32a is formed so as to face the first through hole 22a in the right-left direction.

The fastener 40 is inserted through the first through hole 22a and the second through hole 32a and tightens the first member 20 and the second member 30 to each other in the right-left direction. In the embodiment, the fastener 40 includes a bolt 42 and a nut 44, and by tightening the nut 44 in a state where the bolt 42 is passed through the first through hole 22a and the second through hole 32a, the first member 20 and the second member 30 are tightened.

The first connecting portion 24 of the first member 20 is formed into a plate shaped and protrudes to diagonally upper left from an upper end portion of the first base portion 22. In the embodiment, the first connecting portion 24 is formed so as to be biased slightly to the front with respect to the center part of the first base portion 22 in the front-back direction. The second connecting portion 34 of the second member 30 is formed in a plate shape and protrudes to diagonally upper right from an upper end portion of the second base portion 32. In the embodiment, the second connecting portion 34 is formed so as to be biased slightly backward with respect to the center part of the second base portion 32 in the front-back direction.

Also, in the embodiment, a portion facing the second connecting portion 34 in the right-left direction among the first connecting portion 24 is specified as a first clamping portion 24a, and a portion facing the first clamping portion 24a in the right-left direction among the second connecting portion 34 is specified as a second clamping portion 34a. In the embodiment, the first connecting portion 24 and the second connecting portion 34 are twisted counterclockwise with respect to the front-back direction such that the first clamping portion 24a and the second clamping portion 34a are tilted to the left with respect to the front-back direction when seen from above.

In the embodiment, an upper part of the second connecting portion 34 is provided behind an upper part of the first connecting portion 24 in such a manner as to overlap with the upper part of the first connecting portion 24 when seen from the front-back direction. In the embodiment, a notch 24b is formed on a backward side of the upper part of the first connecting portion 24 and a notch 34b is formed on the frontward side of the upper part of the second connecting portion 34 such that the upper part of the first connecting portion 24 and the upper part of the second connecting portion can be crossed each other when seen from the front-back direction.

The first supporting portion 26 is provided below the first base portion 22 and is curved arcuately in such a manner as to project toward the right. The second supporting portion 36 is provided below the second base portion 32 and is curved arcuately in such a manner as to project toward the left. In the embodiment, a notch 26a is formed in a lower part of the first supporting portion 26 and a notch 36a (see FIG. 6B) is formed in a lower part of the second supporting portion 36 such that the lower part of the first supporting portion 26 and the lower part of the second supporting portion 36 can be crossed each other when seen from the front-back direction in a state where the hanger 12 and the support wire 14 are not provided between the first member 20 and the second member 30. As a result, when the clamp 10 is not in use, the clamp 10 can be stored in a state where a length of the clamp 10 in the right-left direction is reduced.

In the embodiment, a protective film 50 made of a resin is formed so as to cover a surface of the first supporting portion 26 of the first member 20, and a protective film 52 made of a resin is formed so as to cover a surface of the second supporting portion 36 of the second member 30. The protective films 50 and 52 can be formed by heretofore known various resins. In the embodiment, the protective films 50 and 52 can be formed, for example, by polyvinyl chloride.

The first locking portion 28 of the first member 20 protrudes upward from the first base portion 22 at a position away from the first connecting portion 24 backward and extends to the left to pass behind the second connecting portion 34 of the second member 30. In the embodiment, the first connecting portion 24 and the first locking portion 28 are provided so as to form a V-shape when seen from the front-back direction. The second locking portion 38 of the second member 30 protrudes upward from the second base portion 32 at a position away to the front from the second connecting portion 34 and extends to the right to pass in front of the first connecting portion 24 of the first member 20. In the embodiment, the second connecting portion 34 and the second locking portion 38 are provided so as to form the V-shape when seen from the front-back direction.

In the embodiment, the hanger 12 can be mounted on the support wire 14 by tightening the first member 20 and the second member 30 by the fastener 40, in the state where the support wire 14 is passed through between the first supporting portion 26 and the second supporting portion 36 and the hanger 12 is passed through between the first clamping portion 24a and the second clamping portion 34a.

Here, in the embodiment, by tilting the first clamping portion 24a and the second clamping portion 34a to the left with respect to the front-back direction, the hanger 12 can be clamped by the first clamping portion 24a and the second clamping portion 34a while the support wire 14 is clamped by the first supporting portion 26 and the second supporting portion 36. That is, the hanger 12 and the support wire 14 can be clamped by the first member 20 and the second member 30 without using another plate material.

Moreover, in the embodiment, the first connecting portion 24 and the second connecting portion 34 overlap with each other above the hanger 12 when seen from the front-back direction. As a result, the hanger 12 can be sufficiently prevented from escaping from the clamp 10 to above by the first connecting portion 24 and the second connecting portion 34.

As a result, the spiral hanger can be mounted on the support wire correctly while the number of components of the clamp 10 is reduced.

Moreover, in the embodiment, the second locking portion 38, the first connecting portion 24, the second connecting portion 34, and the first locking portion 28 are provided so as to be aligned in order from the front and are provided in such a manner as to overlap with each other when seen from the front-back direction. In the case, locking of the second locking portion 38, the first connecting portion 24, the second connecting portion 34, and the first locking portion 28 with each other can prevent rotation of the first member 20 and the second member 30 around the fastener 40 (bolt 42). As a result, workability when mounting the clamp 10 on the hanger 12 and the support wire 14 is improved.

Moreover, in the embodiment, the protective film 50 composed of the resin is formed on the surface of the first supporting portion 26, and the protective film 52 composed of the resin is formed on the surface of the second supporting portion 36. As a result, when the support wire 14 is clamped by the first supporting portion 26 and the second supporting portion 36, damage on the support wire 14 can be sufficiently suppressed.

Moreover, in the embodiment, the first connecting portion 24 and the first locking portion 28 are provided so as to form the V-shaped when seen from the front-back direction. Similarly, in the embodiment, the second connecting portion 34 and the second locking portion 38 are provided so as to form the V-shape when seen from the front-back direction. The first connecting portion 24 and the first locking portion 28 as well as the second connecting portion 34 and the second locking portion 38 are provided so as to be meshed with each other with the hanger 12 between them, respectively. As a result, the hanger 12 can be fixed to the clamp 10 correctly.

Also, in the embodiment, the case where the first connecting portion 24 is provided closer to the front than the second connecting portion 34, and the first connecting portion 24 and the second connecting portion 34 are twisted counterclockwise with respect to the front-back direction such that the first clamping portion 24a and the second clamping portion 34a are tilted to the left with respect to the front-back direction was explained. However, corresponding to the shape of the hanger, the first connecting portion 24 may be provided closer backward than the second connecting portion 34 and the first connecting portion 24 and the second connecting portion 34 may be twisted clockwise with respect to the front-back direction such that the first clamping portion 24a and the second clamping portion 34a are tilted to the right with respect to the front-back direction. Moreover, in the embodiment, the case where the first connecting portion 24 is provided on the front of the first locking portion 28, and the second connecting portion 34 is provided behind the second locking portion 38 was explained, but in accordance with the shape of the hanger, the first connecting portion 24 may be provided behind the first locking portion 28, and the second connecting portion 34 may be provided on the front of the second locking portion 38.

INDUSTRIAL APPLICABILITY

According to the present invention, the clamp that enables the spiral hanger to be mounted on the support wire correctly while the increase in the number of the components is suppressed can be obtained.

What is claimed is:

1. A clamp for mounting a spiral hanger on a support wire extending in a front-back direction, comprising:

a first member having a first through hole formed therein, the first through hole penetrating in a right-left direction;
a second member provided to the left of the first member and having a second through hole formed therein, the second through hole penetrating in the right-left direction and facing the first through hole; and
a fastener inserted through the first through hole and the second through hole and tightening the first member and the second member to each other in the right-left direction, wherein
the first member has:
a plate-shaped first base portion having the first through hole formed therein;
a plate-shaped first connecting portion protruding from the first base portion to diagonally upper left; and
a first supporting portion provided below the first base portion and curved arcuately in such a manner as to project toward the right;
the second member has:
a plate-shaped second base portion having the second through hole formed therein;
a plate-shaped second connecting portion protruding from the second base portion to diagonally upper right, the second connecting portion being provided to overlap with the first connecting portion above the spiral hanger when seen from the front-back direction; and
a second supporting portion provided below the second base portion and curved arcuately in such a manner as to project toward the left;
the first connecting portion has a first clamping portion facing the second connecting portion in the right-left direction;
the second connecting portion has a second clamping portion facing the first clamping portion in the right-left direction;
the spiral hanger is mounted on the support wire by tightening the first member and the second member by the fastener in a state where the support wire is passed through between the first supporting portion and the second supporting portion and the spiral hanger is passed through between the first clamping portion and the second clamping portion; and
the first connecting portion and the second connecting portion are twisted clockwise or counterclockwise with respect to the front-back direction so that a portion of the spiral hanger passing through between the first clamping portion and the second clamping portion is tilted with respect to the front-back direction when seen from above.

2. The clamp according to claim 1, wherein
the first member has a first locking portion protruding upward from the first base portion at a position away from the first connecting portion backward and extending to the left to pass behind the second connecting portion;
the second member has a second locking portion protruding upward from the second base portion at a position away from the second connecting portion forward and extending to the right to pass in front of the first connecting portion;
an upper part of the second connecting portion is provided behind an upper part of the first connecting portion in such a manner as to overlap with the upper part of the first connecting portion when seen from the front-back direction; and the first connecting portion and the second connecting portion are twisted counterclockwise such that the first clamping portion and the second clamping portion are tilted to the left with respect to the front-back direction when seen from above.

3. The clamp according to claim 1, wherein
a notch is formed on a backward side of an upper part in the first connecting portion and on a frontward side of an upper part in the second connecting portion, respectively, such that the upper part of the first connecting portion and the upper part of the second connecting portion can be crossed each other when seen from the front-back direction.

4. The clamp according to claim 1, wherein
a notch is formed in a lower part of the first supporting portion and in a lower part of the second supporting portion, respectively, such that the lower part of the first supporting portion and the lower part of the second supporting portion can be crossed each other when seen from the front-back direction.

5. The clamp according to claim 1, wherein
a protective film composed of a resin is formed on a surface of each of the first supporting portion and the second supporting portion.

6. A clamp for mounting a spiral hanger on a support wire extending in a front-back direction, comprising:
a first member having a first through hole formed therein, the first through hole penetrating in a right-left direction;
a second member provided to the left of the first member and having a second through hole formed therein, the second through hole penetrating in the right-left direction and facing the first through hole; and
a fastener inserted through the first through hole and the second through hole and tightening the first member and the second member to each other in the right-left direction, wherein
the first member has:
a plate-shaped first base portion having the first through hole formed therein;
a plate-shaped first connecting portion protruding from the first base portion to diagonally upper left; and
a first supporting portion provided below the first base portion and curved arcuately in such a manner as to project toward the right;
the second member has:
a plate-shaped second base portion having the second through hole formed therein;
a plate-shaped second connecting portion protruding from the second base portion to diagonally upper right, the second connecting portion being provided to overlap with the first connecting portion above the spiral hanger when seen from the front-back direction; and
a second supporting portion provided below the second base portion and curved arcuately in such a manner as to project toward the left;
the first connecting portion has a first clamping portion facing the second connecting portion in the right-left direction;
the second connecting portion has a second clamping portion facing the first clamping portion in the right-left direction;
the first connecting portion and the second connecting portion are twisted clockwise or counterclockwise such that the first clamping portion and the second clamping portion are tilted to the right or to the left with respect to the front-back direction when seen from above; and the spiral hanger is mounted on the support wire by tightening the first member and the second member by the fastener in a state where the support wire is passed through between the first supporting portion and the second supporting portion and the spiral hanger is passed through between the first clamping portion and the second clamping portion; and further wherein the first member has a first locking portion protruding upward from the first base portion at a position away from the first connecting portion backward and extending to the left to pass behind the second connecting portion;

the second member has a second locking portion protruding upward from the second base portion at a position away from the second connecting portion forward and extending to the right to pass in front of the first connecting portion;

an upper part of the second connecting portion is provided behind an upper part of the first connecting portion in such a manner as to overlap with the upper part of the first connecting portion when seen from the front-back direction; and the first connecting portion and the second connecting portion are twisted counterclockwise such that the first clamping portion and the second clamping portion are tilted to the left with respect to the front-back direction when seen from above.

7. The clamp according to claim 6, wherein
a notch is formed on a backward side of an upper part in the first connecting portion and on a frontward side of an upper part in the second connecting portion, respectively, such that the upper part of the first connecting portion and the upper part of the second connecting portion can be crossed each other when seen from the front-back direction.

8. The clamp according to claim 6, wherein
a notch is formed in a lower part of the first supporting portion and in a lower part of the second supporting portion, respectively, such that the lower part of the first supporting portion and the lower part of the second supporting portion can be crossed each other when seen from the front-back direction.

9. The clamp according to claim 6, wherein
a protective film composed of a resin is formed on a surface of each of the first supporting portion and the second supporting portion.

10. A clamp for mounting a spiral hanger on a support wire extending in a front-back direction, comprising:
a first member having a first through hole formed therein, the first through hole penetrating in a right-left direction;
a second member provided to the left of the first member and having a second through hole formed therein, the second through hole penetrating in the right-left direction and facing the first through hole; and
a fastener inserted through the first through hole and the second through hole and tightening the first member and the second member to each other in the right-left direction, wherein
the first member has:
a plate-shaped first base portion having the first through hole formed therein;
a plate-shaped first connecting portion protruding from the first base portion to diagonally upper left; and
a first supporting portion provided below the first base portion and curved arcuately in such a manner as to project toward the right;

the second member has:
a plate-shaped second base portion having the second through hole formed therein;
a plate-shaped second connecting portion protruding from the second base portion to diagonally upper right, the second connecting portion being provided to overlap with the first connecting portion above the spiral hanger when seen from the front-back direction; and
a second supporting portion provided below the second base portion and curved arcuately in such a manner as to project toward the left;

the first connecting portion has a first clamping portion facing the second connecting portion in the right-left direction;

the second connecting portion has a second clamping portion facing the first clamping portion in the right-left direction;

the first connecting portion and the second connecting portion are twisted clockwise or counterclockwise such that the first clamping portion and the second clamping portion are tilted to the right or to the left with respect to the front-back direction when seen from above; and the spiral hanger is mounted on the support wire by tightening the first member and the second member by the fastener in a state where the support wire is passed through between the first supporting portion and the second supporting portion and the spiral hanger is passed through between the first clamping portion and the second clamping portion; and further wherein a notch is formed on a backward side of an upper part in the first connecting portion and on a frontward side of an upper part in the second connecting portion, respectively, such that the upper part of the first connecting portion and the upper part of the second connecting portion can be crossed each other when seen from the front-back direction.

11. The clamp according to claim 10, wherein
the first member has a first locking portion protruding upward from the first base portion at a position away from the first connecting portion backward and extending to the left to pass behind the second connecting portion;

the second member has a second locking portion protruding upward from the second base portion at a position away from the second connecting portion forward and extending to the right to pass in front of the first connecting portion;

an upper part of the second connecting portion is provided behind an upper part of the first connecting portion in such a manner as to overlap with the upper part of the first connecting portion when seen from the front-back direction; and the first connecting portion and the second connecting portion are twisted counterclockwise such that the first clamping portion and the second clamping portion are tilted to the left with respect to the front-back direction when seen from above.

12. The clamp according to claim 10, wherein
a notch is formed in a lower part of the first supporting portion and in a lower part of the second supporting portion, respectively, such that the lower part of the first supporting portion and the lower part of the second supporting portion can be crossed each other when seen from the front-back direction.

13. The clamp according to claim 10, wherein
a protective film composed of a resin is formed on a surface of each of the first supporting portion and the second supporting portion.

14. A clamp for mounting a spiral hanger on a support wire extending in a front-back direction, comprising:
a first member having a first through hole formed therein, the first through hole penetrating in a right-left direction;
a second member provided to the left of the first member and having a second through hole formed therein, the second through hole penetrating in the right-left direction and facing the first through hole; and
a fastener inserted through the first through hole and the second through hole and tightening the first member and the second member to each other in the right-left direction, wherein
the first member has:
a plate-shaped first base portion having the first through hole formed therein;
a plate-shaped first connecting portion protruding from the first base portion to diagonally upper left; and
a first supporting portion provided below the first base portion and curved arcuately in such a manner as to project toward the right;
the second member has:
a plate-shaped second base portion having the second through hole formed therein;
a plate-shaped second connecting portion protruding from the second base portion to diagonally upper right, the second connecting portion being provided to overlap with the first connecting portion above the spiral hanger when seen from the front-back direction; and
a second supporting portion provided below the second base portion and curved arcuately in such a manner as to project toward the left;
the first connecting portion has a first clamping portion facing the second connecting portion in the right-left direction;
the second connecting portion has a second clamping portion facing the first clamping portion in the right-left direction;
the first connecting portion and the second connecting portion are twisted clockwise or counterclockwise such that the first clamping portion and the second clamping portion are tilted to the right or to the left with respect to the front-back direction when seen from above; and the spiral hanger is mounted on the support wire by tightening the first member and the second member by the fastener in a state where the support wire is passed through between the first supporting portion and the second supporting portion and the spiral hanger is passed through between the first clamping portion and the second clamping portion; and further wherein
a notch is formed in a lower part of the first supporting portion and in a lower part of the second supporting portion, respectively, such that the lower part of the first supporting portion and the lower part of the second supporting portion can be crossed each other when seen from the front-back direction.

15. The clamp according to claim 14, wherein
the first member has a first locking portion protruding upward from the first base portion at a position away from the first connecting portion backward and extending to the left to pass behind the second connecting portion;
the second member has a second locking portion protruding upward from the second base portion at a position away from the second connecting portion forward and extending to the right to pass in front of the first connecting portion;
an upper part of the second connecting portion is provided behind an upper part of the first connecting portion in such a manner as to overlap with the upper part of the first connecting portion when seen from the front-back direction; and
the first connecting portion and the second connecting portion are twisted counterclockwise such that the first clamping portion and the second clamping portion are tilted to the left with respect to the front-back direction when seen from above.

16. The clamp according to claim 14, wherein
a notch is formed on a backward side of an upper part in the first connecting portion and on a frontward side of an upper part in the second connecting portion, respectively, such that the upper part of the first connecting portion and the upper part of the second connecting portion can be crossed each other when seen from the front-back direction.

17. The clamp according to claim 14, wherein
a protective film composed of a resin is formed on a surface of each of the first supporting portion and the second supporting portion.

* * * * *